United States Patent
Li et al.

(10) Patent No.: US 8,170,298 B2
(45) Date of Patent: May 1, 2012

(54) METHOD FOR DETECTING FACIAL EXPRESSION AND REPAIRING SMILE FACE OF PORTRAIT PHOTO

(75) Inventors: Shu Li, Hangzhou (CN); Han Qiu, Hangzhou (CN); Jin Wang, Hangzhou (CN)

(73) Assignee: Arcsoft, Inc., Fremont, CA (US)

( * ) Notice: Subject to any disclaimer, the term of this patent is extended or adjusted under 35 U.S.C. 154(b) by 1020 days.

(21) Appl. No.: 12/153,297

(22) Filed: May 16, 2008

(65) Prior Publication Data

US 2009/0285455 A1 Nov. 19, 2009

(51) Int. Cl.
*G06K 9/00* (2006.01)

(52) U.S. Cl. ........ 382/118; 382/116; 382/260; 345/441; 345/473

(58) Field of Classification Search ........... 382/116, 382/118, 254, 260; 345/441, 473
See application file for complete search history.

(56) References Cited

U.S. PATENT DOCUMENTS

| | | | |
|---|---|---|---|
| 5,774,129 A * | 6/1998 | Poggio et al. | 345/441 |
| 2005/0200722 A1* | 9/2005 | Ono | 348/222.1 |
| 2006/0143647 A1* | 6/2006 | Bill | 725/10 |
| 2007/0201725 A1* | 8/2007 | Steinberg et al. | 382/103 |

* cited by examiner

*Primary Examiner* — Matthew Bella
*Assistant Examiner* — Eueng-Nan Yeh
(74) *Attorney, Agent, or Firm* — Bacon & Thomas, PLLC

(57) ABSTRACT

A method for detecting a facial expression and repairing a smile face of a portrait photo includes the steps of: detecting a location and a range of a mouth region in an inputted portrait photo; capturing a patch in the mouth region and a predetermined peripheral range thereof; executing a comparison process to a smile state or a stiff state of the mouth region in the patch by a mouth state classifier; executing a calculation process to a repaired region of the mouth region when the mouth region is determined to be in the stiff state, in order to calculate a location of a plurality of feature points in the repaired region of the mouth region; and executing an image warping process to the location of the feature points and adjacent pixels thereof, for generating a portrait photo showing a smile state.

2 Claims, 4 Drawing Sheets

METHOD FOR DETECTING FACIAL EXPRESSION AND REPAIRING SMILE FACE OF PORTRAIT PHOTO

FIELD OF THE INVENTION

The present invention relates to a method for repairing a portrait photo, and more particularly to a method applied to an electronic image-capturing device for automatically calculating a location of a plurality of feature points in a mouth region of a portrait photo, when detecting and determining that the mouth region is in the stiff state, and executing an image warping process to the location of the feature points to ensure that the processed portrait photo is in a repaired smile state showing a slightly opened mouth and slightly raised corners.

BACKGROUND OF THE INVENTION

Presently, with the advance of digital photographic technologies, various of electronic devices (such as digital cameras, digital video cameras, notebook computers, and mobile phones and etc.) having digital image-capturing elements are continuously developed and improved. There is a trend to enhance the photographic quality of the electronic devices, minimize the volume thereof, and lower the selling price thereof. Therefore, electronic image-capturing devices are more and more popular in the market. As a result, it is important for related manufacturers of the electronic image-capturing devices to develop and design an electronic image-capturing device having an intelligent image capturing function for satisfying basic photographic functions needed by most users and overcoming the insufficient photographic skill thereof.

Generally, most of various photos captured by a traditional electronic image-capturing device operated by a user are portrait photos. When capturing a portrait photo, the user usually continues to seek for a suitable transient scene, in order to capture a portrait photo, which can show a best appearance of the captured person. However, what kind of the appearance is the best one which can be agreed and accepted by the most users? The answer is an appearance showing a smile face of the captured person during his/her mouth is slightly opened and corners of the mouth are slightly raised. Thus, when capturing a portrait photo, the captured person usually hopes that a photographer can capture a portrait photo when the captured person transiently shows his/her smile face. However, in fact, it is unfortunate that the captured person generally can not have a timely communication or a sufficient consensus with the photographer, such that the captured person can not be precisely aware of the best transience when the photographer presses a shutter button. As a result, when the photographer presses the shutter button, the captured person may unwittingly close his/her mouth, resulting in generating an unnatural or stiff face. Even, after the photographer told the captured person to keep smiling and be ready for taking a photo, the captured person still can not continuously keep the same smile face. As a result, the captured person may close his/her mouth at the transient moment of pressing the shutter button. In other words, the original smile face of the captured person may suddenly become the unnatural or stiff face. The foregoing unexpected conditions cause the portrait photo captured by the photographer only shows the unnatural or unbeautiful face, which may not be satisfied or accepted by the captured person. Especially, when the photographer takes a photo of many people or children, the portrait photo inevitably shows closed mouths of the captured people. Specifically, if the photographer can not take a photo having smile faces of all captured people in a memorable or a rememberable day, it will be very regrettable. As a result, it is important for related manufacturers of electronic image-capturing devices to develop and design an image correction technology for improving the electronic image-capturing devices to be capable of detecting if the mouth of the captured portrait photo is in a closed stiff state and automatically repairing the mouth when the mouth is determining to be closed, so as to automatically repair the mouth to be in a smile state having a slightly opened mouth and slightly raised corners, thereby enhancing the portrait photo more natural and more esthetic, and substantially increasing the successful ratio of taking good portrait photos.

It is therefore tried by the inventor(s) to develop a method for detecting a facial expression and repairing a smile face of a portrait photo to solve the problems existing in the traditional electronic image-capturing device that can not precisely determine if the mouth of the captured person is in an unnatural or stiff state at the transient moment of pressing the shutter button, resulting in only capturing a portrait photo captured by the photographer, which can not be satisfied or accepted by the captured person, as described above.

SUMMARY OF THE INVENTION

A primary object of the present invention is to provide a method for detecting a facial expression and repairing a smile face of a portrait photo, which is applied to an electronic image-capturing device and comprises the steps of: detecting a location and a range of a mouth region in a captured portrait photo; capturing a patch in the mouth region and a predetermined peripheral range thereof, wherein the patch is able to fully show various facial expressions in the mouth region and the predetermined peripheral range; executing a comparison process to a smile state or a stiff state of the mouth region in the patch by a mouth state classifier; executing a calculation process to a repaired region of the mouth region when the mouth region is determined to be in the stiff state, in order to calculate a location of a plurality of feature points in the repaired region of the mouth region; and executing an image warping process to the location of the feature points and adjacent pixels thereof, in order to ensure that the processed portrait photo is in a repaired smile state showing a slightly opened mouth and slightly raised corners.

A secondary object of the present invention is to provide a method for detecting a facial expression and repairing a smile face of a portrait photo, which is applied to a photo processing device and comprises the steps of: detecting a location and a range of a mouth region in an inputted portrait photo; capturing a patch in the mouth region and a predetermined peripheral range thereof; executing a comparison process to a smile state or a stiff state of the mouth region in the patch by a mouth state classifier; executing a calculation process to a repaired region of the mouth region when the mouth region is determined to be in the stiff state, in order to calculate a location of a plurality of feature points in the repaired region of the mouth region; and executing an image warping process to the location of the feature points and adjacent pixels thereof, for generating a portrait photo showing a smile state.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
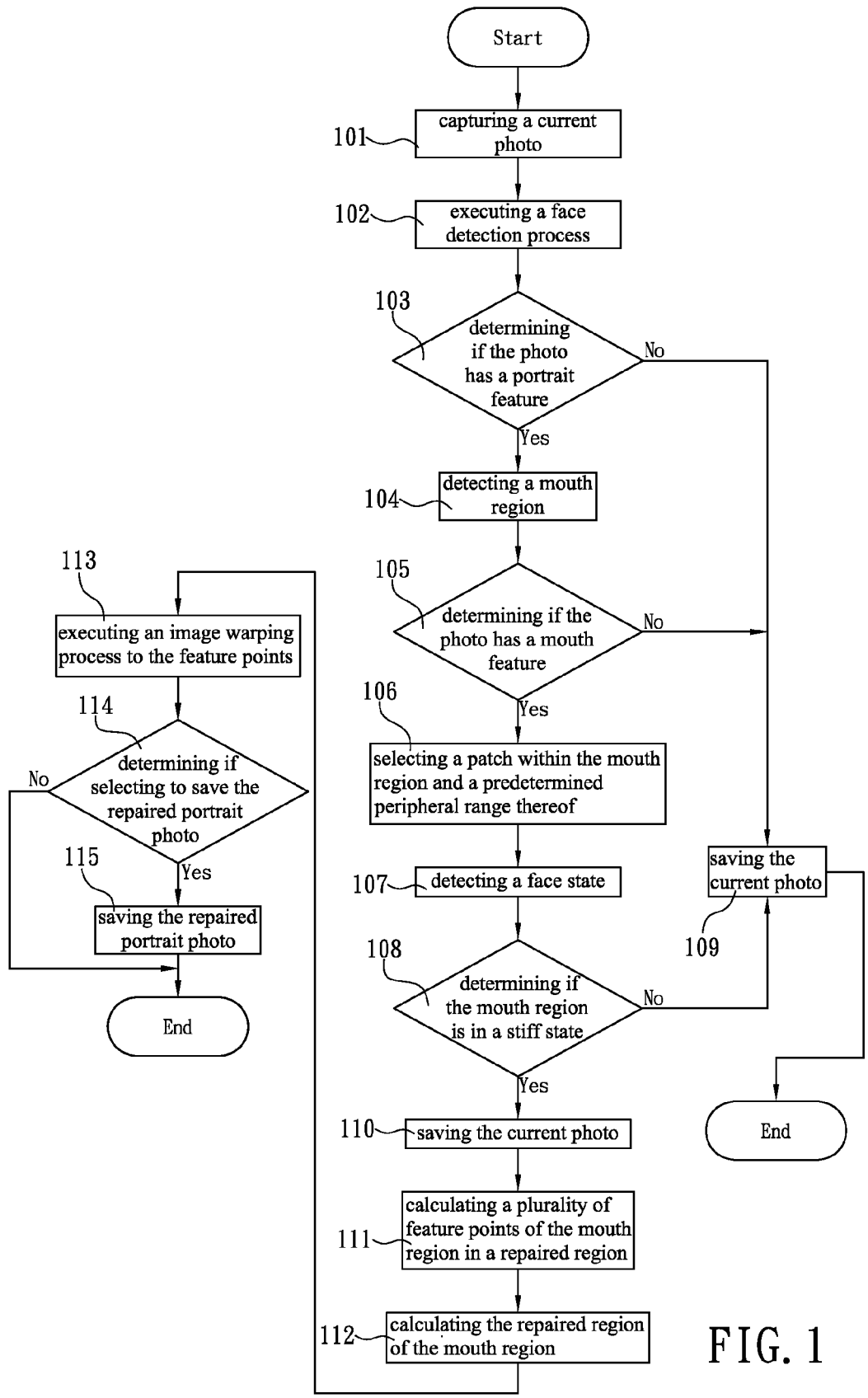
FIG. 1 is a flowchart of a method for detecting a facial expression of a portrait photo applied to an electronic image-capturing device according to a preferred embodiment of the present invention.

In a first preferred embodiment of the present invention, the method for detecting a facial expression and repairing a smile face of a portrait photo is applied to an electronic image-capturing device. The electronic image-capturing device is preferably selected from various electronic devices having a digital image-capturing element (such as a CCD element or a CMOS element). For example, the electronic image-capturing device can be selected from a digital camera, a digital video camera, a notebook computer, a mobile phone, and etc. When the electronic image-capturing device detects and determines that a captured portrait photo has a mouth region in a closed stiff state, including the mouth region and a peripheral range thereof, which is used to fully show a facial expression, will be repaired. Thus, the repaired portrait photo will provide the mouth region showing with a repaired smile state. In the preferred embodiment of the present invention, when a user takes a portrait photo by the electronic image-capturing device, the method of the present invention executes the following steps via the electronic image-capturing device, as shown in FIG. 1:

In step 101: capturing a current photo via a digital image-capturing element.

In step 102: executing a face detection process to the photo, wherein various algorithms for the face detection are disclosed in many publications, such as according to the OpenCV portrait detection software designed by the Adaboost algorithm, the Haar-like feature, and other related recognition technologies. The detection software is provided with a portrait state classifier trained according to a predetermined number of portrait photo samples, i.e. a classifier capable of determining if the objects in a photo is a portrait feature or not. In the present invention, the portrait state classifier is used to detect and quickly recognize a portrait feature in a photo. Due to the detection algorithms are prior arts and not subject matters of the present invention, the detailed description thereof will be omitted.

In step 103: determining if the photo has a portrait feature; if yes, go to step 104; and if not, go back to the step 101.

In step 104: marking a location and a range of the portrait feature in the photo, and then detecting a location and a range of a mouth region of the portrait feature, wherein an algorithm for detecting the mouth region is also disclosed in many publications, as described above, and can be selected from a mouth state classifier trained according to a predetermined number of mouth photo samples, i.e. a classifier capable of determining if the objects in a photo has a mouth feature or not. Due to the mouth state classifier is a prior art and not a subject matter of the present invention, the detailed description thereof will be omitted.

In step 105: determining if the photo has a mouth feature; if yes, go to step 106; and if not, go back to the step 101.

Figure 2:
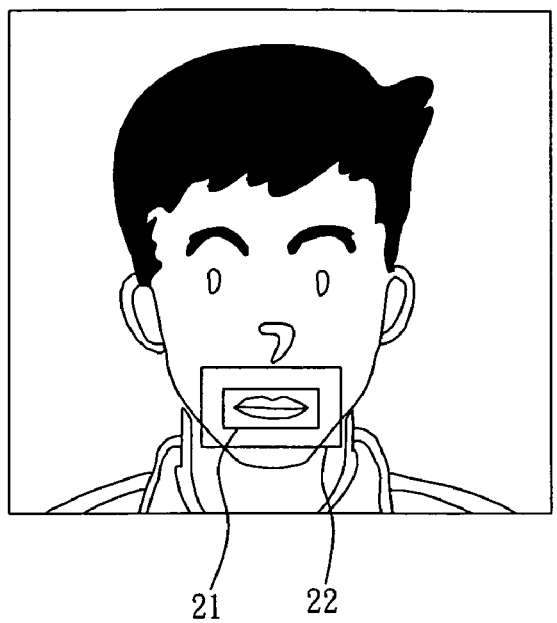
FIG. 2 is a schematic view of a method for detecting a mouth region of the portrait photo according to the preferred embodiment of the present invention.

In step 106: marking the location and the range of a mouth region of the portrait photo, and then expanding a to-be-recognized range of the mouth region with a predetermined ratio, i.e. a small frame 21 as shown in FIG. 2. For example, expanding the mouth region to a length and a width greater than the original mouth region about 1.5-folded; i.e. a large frame 22 as shown in FIG. 2. Then, selecting a patch within the mouth region and a predetermined peripheral range thereof by according to the expanded to-be-recognized range. Except for the photo of the mouth region, the patch further includes the photo within the predetermined peripheral range of the mouth region, so that the patch can fully show various facial expressions of the mouth region.

Figure 3:
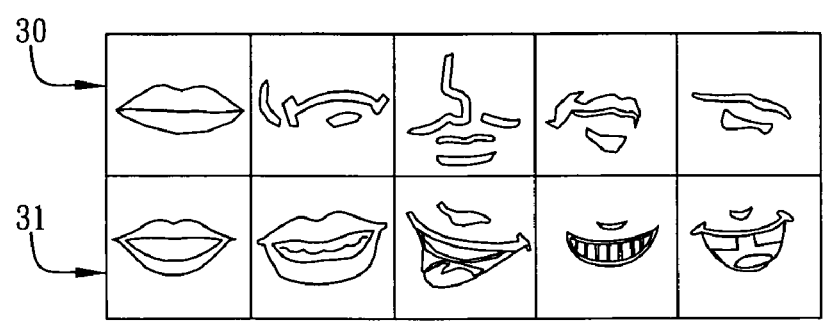
FIG. 3 is a schematic view of a predetermined number of mouth photo samples of the portrait photo, which show a smile state or a stiff state, for the detecting method to train a state classifier based on the Adaboost algorithm according to the preferred embodiment of the present invention.

In step 107: detecting a smile state or stiff state of the mouth region in the patch (i.e. a facial expression showed by the mouth region), wherein an algorithm for detecting the facial expression is described hereinbefore, and can be selected from a mouth state classifier based on the Adaboost algorithm and trained according to a predetermined number of mouth photo samples 30 and 31 in a smile state or a stiff state, as shown in FIG. 3.

Figure 4:
FIG. 4 is a schematic view of a portrait photo captured by the electronic image-capturing device, which shows a mouth region in a stiff state, according to the preferred embodiment of the present invention.

In step 108: determining if the mouth region in the patch is in the stiff state or the smile state; if the mouth region is in the smile state, go to step 109; otherwise if the mouth region is in the stiff state, as shown in FIG. 4 go to step 110.

In step 109: saving the current photo into a memory unit or a storage unit (such as a hard disk or a memory card and etc.) of the electronic image-capturing device, then go back to the step 101.

In step 110: saving the current photo into the memory unit or the storage unit of the electronic image-capturing device.

Figure 5:
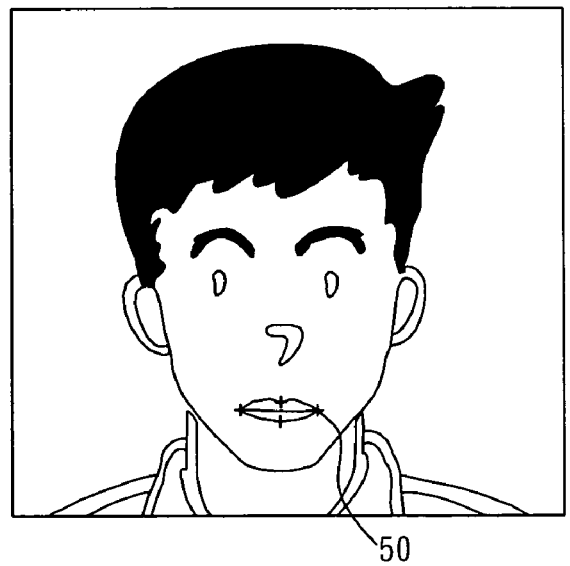
FIG. 5 is a schematic view of calculating the location of a plurality of feature points of the mouth region in a to-be-repaired region of the portrait photo of FIG. 4 according to the preferred embodiment of the present invention.

In step 111, calculating the location of the plurality of feature points 50 of the mouth region in the repaired region, as shown in FIG. 5, wherein the amount and the location of the feature points 50 defined on the mouth region can be varied according to the actual need and the algorithm complication. Because the mouth region may be in a closed or open state with different size and shape, the mouth region highly affects the facial expression showed by the portrait photo. Thus, it is generally necessary to define more feature points 50. Referring FIG. 5, in the preferred embodiment of the present invention, four feature points 50 are defined on the mouth region, and the feature points 50 are equidistantly arranged along an outer edge of a lip of the mouth region.

Figure 6:
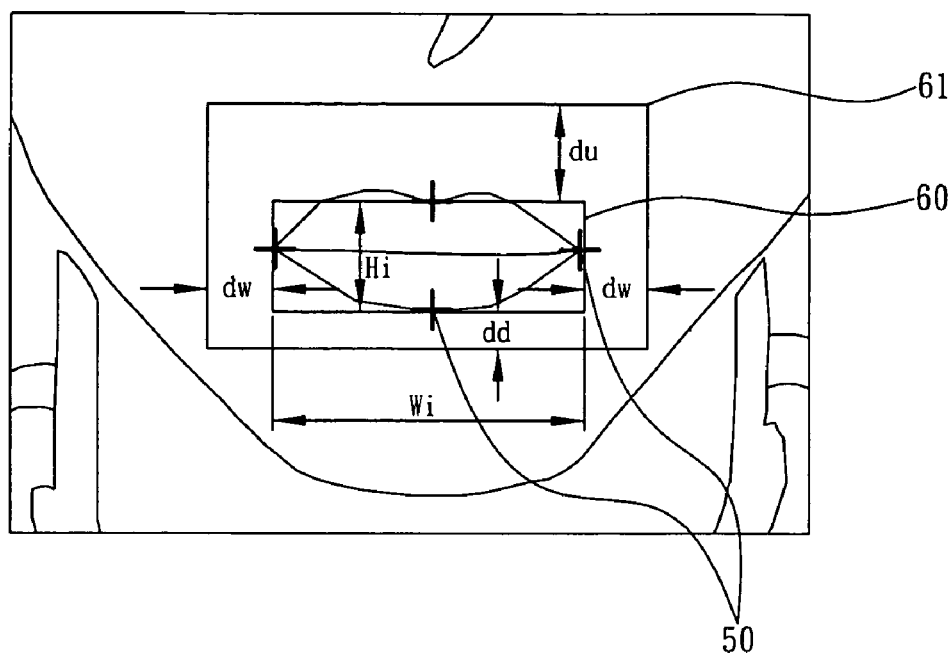
FIG. 6 is a schematic view of calculating the location of the plurality of feature points of the mouth region in a repaired region of the portrait photo of FIG. 4 according to the preferred embodiment of the present invention.

In step 112: calculating the repaired region of the mouth region, as shown in FIG. 6. In the preferred embodiment of the present invention, selecting four feature points 50 located at four outermost points (i.e. an uppermost point, a lowermost point, a leftmost point, and a rightmost point) of the mouth region. Then, defining an inner rectangle 60 by the four selected outermost feature points 50, wherein the inner rectangle 60 is used as a to-be-repaired region having a width $W_i$ and a height $H_i$. After this, expanding the to-be-repaired region with a predetermined range to an outer rectangle 61, that is a repaired region. The expanded range of the outer rectangle 61 is symmetrically extended outward along each perpendicular direction of each sides of the inner rectangle 60, as shown in FIG. 6, wherein the differences $d_w$, $d_d$, and $d_u$ are calculated by the following equations:

$$d_w = W_i/5.$$

$$d_d = H_i/4; \text{ and}$$

$$d_u = H_i/2$$

Figure 7:
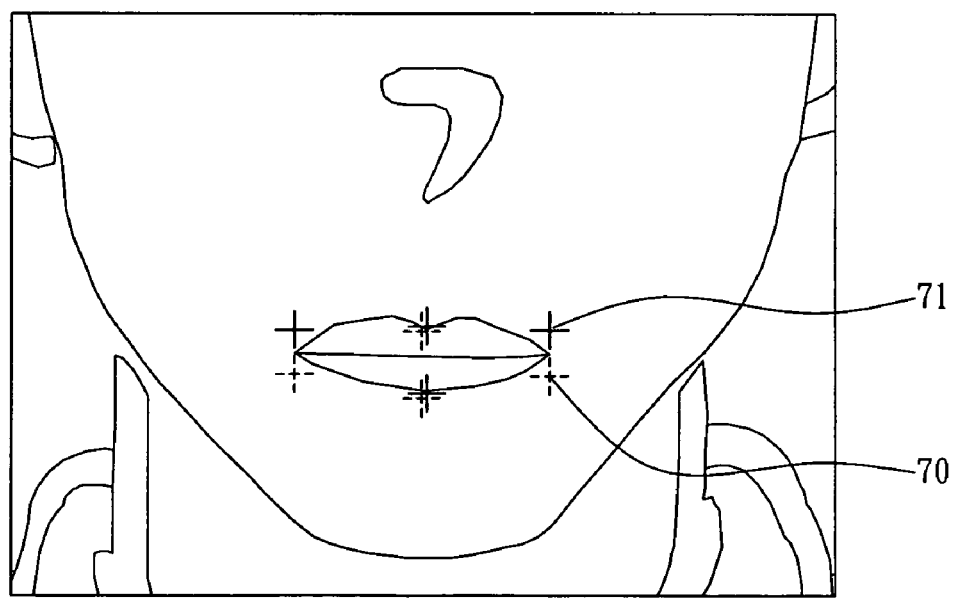
FIG. 7 is a schematic view of generating a portrait photo having a mouth region in a smile state after the portrait photo of FIG. 4 is repaired according to the preferred embodiment of the present invention.

In step 113, executing an image warping process to the location of the feature points and adjacent pixels thereof, so as to generate a portrait photo showing a smile state (having a slightly open mouth and slightly raised corners thereof), as shown in FIG. 7. Generally, a so-called portrait warping technology can imitate a facial expression of a portrait by twisting and warping a partial region of a photo. In the present invention, the portrait warping technology is used to carry out the image warping process to a photo in the predetermined peripheral range of the mouth feature in the portrait, which can show various facial expressions. Thus, the mouth feature will be twisted and warped to a smile face having the slightly open mouth and the slightly raised corners. In the preferred embodiment of the present invention, the image warping process is executed according to the following algorithms:

(1) Setting a smile face model according to an inputted portrait size and the location of feature points, i.e. setting the following mouth model of a smile face based on said four feature points and according to a point based warping principle. Now referring FIG. 7, dot-cross symbols are feature points 70 of an original photo, while cross symbols are feature points 71 of a warped photo. As a result, four feature points 71 marked by four cross symbols can constitute the mouth model of the smile face. The feature points 70 and the feature points 71 can be calculated by the following equations:

$$\{L_i^1\} = \{(x_i, y_i) | 0 <= i <= M-1\}; \text{ and}$$

$$\{L_i^0\} = \{(u_i, v_i) | 0 <= i <= M-1\};$$

wherein $\{L_i^1\}$ is the feature points 70 of the original photo and $(x_i, y_i)$ represents the coordinates of each feature point 70; $\{L_i^0\}$ is the feature points 71 of the warped photo and $(u_i, v_i)$ represents the coordinates of each feature point 71; and M is equal to 4 (i.e. the number of the feature points).

(2) Generating the following warping function based on the mouth model of the smile face and according to a mapping relationship:

$$T(P) = P + \frac{\sum_{i=0}^{M-1} w_i(P)(L_i^0 - L_i^1)}{\sum_{i=0}^{M-1} w_i(P)}, \quad w_i = (a + d_i)^{-b};$$

wherein, T(P) is the warping function; P is equal to (x,y) $(L_i^0 - L_i^1)$ is the distance between the location of an original feature point and that of the same feature point after being warped; $w_i$ is a weighted value of the feature point; $d_i$ is the distance between P and $\{L_i^0\}$; and a, b are constants. Thus, the image warping process can be executed to the mouth region of the to-be-repaired region 60 according to the warping function, so that the mouth region will be twisted and warped. As a result, referring FIGS. 6 and 7, a mouth photo of a smile face having a slightly opened mouth and slightly raised corners is formed in the repaired region 61.

In step 114, showing a signal on a display, wherein the signal represents if selecting to save the repaired portrait photo; if selecting to save the repaired portrait photo, go to step 115; otherwise, if selecting not to save the repaired portrait photo, go back to the step 101.

In step 115, saving the repaired portrait photo into the memory unit or the storage unit of the electronic image-capturing device, for ensuring that the facial expression of the portrait photo processed by the electronic image-capturing device can be maintained in an optimized esthetic state. Then, go back to the step 101.

In a second preferred embodiment of the present invention, the method for detecting a facial expression and repairing a smile face of a portrait photo is further applied to a photo processing device. The photo processing device can be an electronic device selected from the group consisting of a notebook computer, a personal digital assistant (PDA), a digital camera, or a mobile phone, etc. In the second preferred embodiment, the photo processing device is unnecessary to provide any digital image-capturing element. After the electronic devices read in an inputted portrait photo, some steps similar to the steps of the first preferred embodiment will be executed. The second preferred embodiment comprises the steps of: detecting the location and the range of a mouth region in the inputted portrait photo; capturing a patch in the mouth region and a predetermined peripheral range thereof; executing a comparison process to a smile state or a stiff state of the mouth region in the patch by a mouth state classifier; executing a calculation process to a repaired region of the mouth region when the mouth region is determined to be in a stiff state, in order to calculate the location of a plurality of feature points in the repaired region of the mouth region; and executing an image warping process to the location of the feature points and adjacent pixels thereof. As a result, the method will ensure that the mouth region of the repaired portrait photo is in a smile state.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A method for detecting a facial expression and repairing a smile face of a portrait photo, which is applied to an electronic device, comprising:

detecting a location and a range of a mouth region in an inputted portrait photo;

capturing a patch in the mouth region and a predetermined peripheral range thereof, wherein the patch is able to fully show various facial expressions in the mouth region and the predetermined peripheral range;

executing a comparison process to a smile state or a stiff state of the mouth region in the patch by a mouth state classifier, wherein the mouth state classifier is trained according to a predetermined number of mouth photo samples in a smile state or a stiff state, for determining if the mouth region in the patch is in the smile state or the stiff state;

executing a calculation process to a repaired region of the mouth region when the mouth region is determined to be in the stiff state, wherein the calculation process comprises the steps of:

selecting a plurality of outermost feature points of the mouth region to define a to-be-repaired region, and expanding the to-be-repaired region with a predetermined range to a repaired region which has an expanded range symmetrically extended outward along each perpendicular direction of each sides of the to-be-repaired region;

calculating a location of a plurality of feature points in the repaired region of the mouth region; and executing an image warping process to the location of the feature points and adjacent pixels thereof, for generating a repaired portrait photo showing a repaired mouth with smile state, wherein the image warping process comprises the steps of:

setting a mouth model of a smile face according to a portrait size and the location of the feature points in the portrait photo, wherein the mouth model is set according to a point based warping principle:

$$\{L_i^1\}=\{(x_i,y_i)|0<=i<=M-1\} \text{ and } \{L_i^0\}=\{(u_i,v_i)|0<=i<=M-1\},$$

$\{L_i^1\}$ represents each of the feature points of an original photo, $(x_i,y_i)$ represents coordinates of each feature point of the original photo on the portrait photo, $\{L_i^0\}$ represents each of feature points of a warped photo, and $(u_i,v_i)$ represents coordinates of each feature point 71 of the warped photo on the portrait photo;

generating a warping function based on the mouth model of the smile face and according to a mapping relationship, wherein the warping function is generated according to the mapping relationship, and the warping function is:

$$T(P) = P + \frac{\sum_{i=0}^{M-1} w_i(P)(L_i^0 - L_i^1)}{\sum_{i=0}^{M-1} w_i(P)}, w_i = (a+d_i)^{-b}$$

wherein, T(P) is the warping function; P is equal to (x,v); $(L_i^0-L_i^1)$ is the distance between the location of the original feature point and that of the same feature point after being warped; $w_i$ is a weighted value of the feature point; $d_i$ is the distance between P and $\{L_i^0\}$; and a, b are constants; and executing the image warping process to the mouth region of the to-be-repaired region according to the warping function, so as to form a mouth photo of a smile face in the repaired region.

2. A method for detecting a facial expression and repairing a smile face of a portrait photo, which is applied to an electronic device, comprising:

detecting a location and a range of a mouth region in an inputted portrait photo;

capturing a patch in the mouth region and a predetermined peripheral range thereof, wherein the patch is able to fully show various facial expressions in the mouth region and the predetermined peripheral range;

executing a comparison process to a smile state or a stiff state of the mouth region in the patch by a mouth state classifier; and executing a calculation process to a repaired region of the mouth region when the mouth region is determined to be in the stiff state, wherein the calculation process comprises the steps of:

selecting a plurality of outermost feature points of the mouth region to define a to-be-repaired region, and expanding the to-be-repaired region with a predetermined range to a repaired region which has an expanded range symmetrically extended outward along each perpendicular direction of each sides of the to-be-repaired region;

calculating a location of a plurality of feature points in the repaired region of the mouth region; and executing an image warping process to the location of the feature points and adjacent pixels thereof, for generating a repaired portrait photo showing a repaired mouth with smile state, wherein the image warping process comprises the steps of:

setting a mouth model of a smile face according to a portrait size and the location of the feature points in the portrait photo, wherein the mouth model is set according to a point based warping principle:

$$\{L_i^1\}=\{(x_i,y_i)|0<=i<=M-1\} \text{ and } \{L_i^0\}=\{(u_i,v_i)|0<=i<=M-1\},$$

$\{L_i^1\}$ represents each of the feature points of an original photo, $(x_i,y_i)$ represents coordinates of each feature point of the original photo on the portrait photo, $\{L_i^0\}$ represents each of feature points of a warped photo, and $(u_i,v_i)$ represents coordinates of each feature point 71 of the warped photo on the portrait photo;

generating a warping function based on the mouth model of the smile face and according to a mapping relationship, wherein the warping function is generated according to the mapping relationship, and the warping function is:

$$T(P) = P + \frac{\sum_{i=0}^{M-1} w_i(P)(L_i^0 - L_i^1)}{\sum_{i=0}^{M-1} w_i(P)}, w_i = (a+d_i)^{-b}$$

wherein, T(P) is the warping function; P is equal to (x,y); $(L_i^0-L_i^1)$ is the distance between the location of the original feature point and that of the same feature point after being warped; $w_i$ is a weighted value of the feature point; $d_i$ is the distance between P and $\{L_i^0\}$; and a,b are constants; and executing the image warping process to the mouth region of the to-be-repaired region according to the warping function, so as to form a mouth photo of a smile face in the repaired region.

\* \* \* \* \*